S. W. STICKNEY.
CHECK-HOOKS FOR HARNESS.

No. 190,164.                    Patented May 1, 1877.

UNITED STATES PATENT OFFICE.

STEPHEN W. STICKNEY, OF BUFFALO, NEW YORK, ASSIGNOR OF ONE-FOURTH HIS RIGHT TO PRATT & LETCHWORTH, OF SAME PLACE.

IMPROVEMENT IN CHECK-HOOKS FOR HARNESS.

Specification forming part of Letters Patent No. 190,164, dated May 1, 1877; application filed March 17, 1877.

*To all whom it may concern:*

Be it known that I, STEPHEN W. STICKNEY, of the city of Buffalo, in the county of Erie and State of New York, have invented certain new and useful Improvements in Harness-Hooks, which improvements are fully set forth in the following specification, reference being had to the accompanying drawing.

My invention relates more particularly to a check-hook adapted to be attached to the strap which runs over the back of the horse in harness in which no pad or cross-strap is employed.

Previous to my invention the check-hook has generally been secured to the pad or cross-strap, so that, in harness in which these parts were not used, a check-hook could not be employed.

The object of my invention is to produce a check-hook which is readily and firmly attached to a strap running in the same direction in which the hook is arranged; and its nature will be fully understood from the following description.

Figure 1:
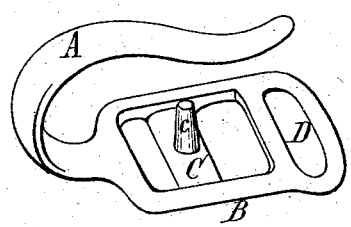
Figure 2:
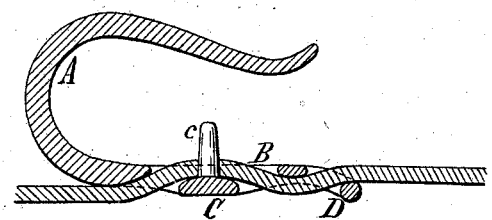

In the accompanying drawing, Figure 1 is a perspective view of my improved hook. Fig. 2 is a longitudinal section of the hook attached to the strap.

Like letters of reference designate like parts in each of the figures.

A represents the hook proper, of ordinary form; and B, a square loop or open frame, arranged at the base of the hook A, and provided with a cross-bar, C, arranged in the frame B at right angles to the longitudinal direction of the hook. $c$ is an upwardly-projecting pin or stud cast centrally upon the cross-bar C. D is a loop arranged at the rear end of the frame B. The hook A, frame B, cross-bar C, stud $c$, and loop D are all readily cast in one piece of suitable metal.

In applying the hook to the strap, the latter is passed through the frame B from below; then over the cross-bar C, the stud $c$ entering one of a series of holes formed in the strap; then underneath the rear bar $b$ of the frame B, and then above the rear bar of the loop D, as clearly shown in Fig. 2. In this manner the hook is attached to the strap in a very simple and efficient way, and firmly held in place, as the rear loop D prevents the rear portion of the frame B from being raised from the strap by the pull of the check-rein. The hook is, furthermore, readily adjusted on the strap by engaging the stud $c$ with any one of the series of holes formed therein.

Having thus fully described my invention, what I claim as new, and desire to secure by Letters Patent, is—

The hook A, formed with the transverse cross-bar C, stud $c$, and rear loop D, whereby the strap is laced and secured, substantially as hereinbefore set forth.

STEPHEN W. STICKNEY.

Witnesses:
EDWARD WILHELM,
GEORGE H. SYKES.